United States Patent [19]

Kniepkamp

[11] Patent Number: 4,819,009

[45] Date of Patent: Apr. 4, 1989

[54] VALVE AND NOZZLE SYSTEM FOR INK JET PRINTING APPARATUS

[75] Inventor: Larry E. Kniepkamp, Freeberg, Ill.

[73] Assignee: Marsh Company, Belleville, Ill.

[21] Appl. No.: 68,420

[22] Filed: Jul. 1, 1987

[51] Int. Cl.[4] .................. G01D 15/16

[52] U.S. Cl. .................. 346/75; 137/625.48; 251/129.16; 346/140 R

[58] Field of Search .................. 346/75, 140; 251/129.16; 137/625.48, 870

[56] References Cited

U.S. PATENT DOCUMENTS

| | | | |
|---|---|---|---|
| 4,131,899 | 12/1978 | Christou | 346/140 |
| 4,254,754 | 5/1979 | Takada | 137/625.48 X |
| 4,378,564 | 3/1983 | Cross | 346/75 |
| 4,460,905 | 7/1984 | Thomas | 346/75 X |

*Primary Examiner*—Joseph W. Hartary
*Attorney, Agent, or Firm*—Rogers, Howell, Moore & Haferkamp

[57] ABSTRACT

A valve and nozzle system for drop on demand ink jet printing apparatus wherein a single valve communicates with a plurality of orifices for controlling the flow of ink simultaneously through the orifices. The valve has a chamber with an inlet port and a plurality of outlet ports communicating with the chamber. The outlet ports have seats that are in a common plane and a piston has a face that, when the valve is closed, simultaneously seats against all the outlet port seats to close the valve. When a solenoid is energized to withdraw the piston and open the valve, the valve face separates simultaneously from the outlet port seats. Thus the outlet ports are opened and closed simultaneously.

11 Claims, 1 Drawing Sheet

VALVE AND NOZZLE SYSTEM FOR INK JET PRINTING APPARATUS

BACKGROUND AND SUMMARY OF THE INVENTION

This invention relates to drop on demand ink jet printing apparatus and more particularly to a valve and nozzle system for suck apparatus.

Drop on demand ink jet printing apparatus operates to discharge individual droplets of ink onto a substrate in a predetermined pattern to be printed. Such apparatus incorporates an array of orifices in a nozzle block, a plurality of control valves, and a controller. The orifices are customarily arranged in a vertical row, and conventional ink jet printing apparatus has incorporated a separate valve communicating with each orifice. The valves are controlled by the controller, which can be keyed by an operator to open and close the nozzles according to a programmed schedule. Thus the operator can establish controller instructions to cause the valves to operate in irregular sequences and at irregular intervals to control the flow of ink through the respective orifices to print one or a series of desired characters or symbols.

Each orifice is designed to emit a single droplet of ink during each opening of its associated valve. The droplets, emitted according to the programmed sequence, are directed toward a substrate where the character or symbol is printed. The quality of print produced by a drop on demand ink jet printer requires precise control over the size of the ink dot that impacts the substrate. Dot size in turn is affected by the size of an ink droplet discharged from a nozzle.

It is critical in the overall design represented by the relationship between valve characteristics, orifice size, and ink characteristics, that the droplets not only be of proper size but also that the size be consistent because otherwise the printed characters or symbols will be irregular in width.

The size of a drop of ink is influenced by the characteristics of the valve and the orifice as well as by the ink specifications, most notably viscosity. For a given ink and a given orifice diameter, the duration of the open period of the valve will affect the size of the drop. Since this open period is very short for an ink jet valve, it is important that the cycle begin with abrupt opening and end with abrupt closing of the valve.

Also, in drop on demand ink jet printing, the substrate is usually moving, may have a wavy surface causing variations in distance the ink droplets must travel before reaching the substrate, and is of varieties of cardboard compositions and consistencies affecting wicking of the ink, to name a few significant variables. Considering these variables, it can be appreciated that great care must be given to a change in any of the components of the system. Thus, the need for uniformity and accuracy requires that all of the components, including the valve, be manufactured with precision. Also, since the valve is relatively expensive and must operate in a great number of short open and close cycles, it must retain its precision through many millions of cycles.

Typically, in early ink jet printing apparatus, a nozzle orifice array consisted of a vertical row of seven orifices coupled with seven control valves. Each control valve controlled the flow of ink through its associated orifice. An example of such a drop on demand ink jet printing apparatus is described and illustrated in U.S. Pat. No. 4,378,564. The subject matter disclosed by that patent is incorporated herein by reference.

In time, the need developed for an increased number of orifices. To meet this need, a larger number of orifices were assembled in a taller vertical array, and a correspondingly greater number of valves were incorporated, again, each nozzle orifice having its own control valve. The typical approach was to increase the number of orifices by superimposing two or more orifice nozzle arrays, each array incorporating the same number of valves as orifices. The increased number of valves increases the cost of the printing apparatus.

A factor in the operation of this equipment is surface tension of the ink. There is a tube connecting each valve outlet port with its associated orifice. When the valve closes, but for surface tension at the orifice opening, ink in the tube would continue to flow through the orifice and destroy the droplet. This surface tension, resulting from viscosity of the ink and the diameter of the orifice, resists the ink pressure upstream of the orifice.

This surface tension at the orifice opening holds ink within the tubing between a valve and an orifice after the valve closes. Without the surface tension, upon closing of the valve upstream of the tubing, ink would drain from the tubing through the orifice. Such surface tension would be lost, for example, if the tubing upstream of the orifice was exposed to the atmosphere and if the strength of the surface tension could not counteract atmospheric pressure. Also, head pressure differentials do not exist at the orifices if the tubes are unexposed to atmospheric pressure. Because of the surface tension, the flow of ink stops immediately when the valve closes. When the valve opens again, a droplet instantly begins to form and, because of the ink source pressure, the droplet is completed and discharged from the orifice in the short time the valve is open.

As has been said, in order for the valve to maintain its precision of operation over many millions of cycles of opening and closing, the design of the valve is crucial. In the conventional ink jet printing system, each valve is solenoid operated and has an ink chamber with a single inlet port and a single outlet port communicating with the chamber. A piston face is actuable against a valve seat surrounding the outlet port to open and close the valve. In this valve, the chamber is large enough to accommodate a piston head having a smaller stem of magnetically responsive metal so that the stem can function as the core of a solenoid. A compression spring normally holds a face of the piston head in contact with the outlet port seat to close the valve. When the valve is closed, the inlet port remains in communication with the chamber. When the solenoid is energized, its magnetic field overcomes the strength of the compression spring and withdraws the piston head from the outlet port, allowing ink to flow from the inlet port, through the chamber to the outlet port. When the magnetic field is released, the compression spring drives the piston head back to close the outlet port.

In ink jet printing done heretofore, the spacing between orifices has produced a printed character or symbol composed of essentially discrete dots of ink. Because of the number of them, these discrete dots have been acceptable in producing a readable character or symbol. However, the traditional ink jet printing apparatus has not been acceptable to print bar codes because of the specifications for bar code printing required to assure accurate reading of the bar codes.

In a bar code, there are a plurality of vertical bars of different widths, and the blank spaces between adjacent bars are of different widths. Bar codes are read by reading the widths of both the printed lines and of the blank spaces between adjacent printed lines. Thus, to read such a bar code accurately, the sequence of varying widths of printed bars and intervening spaces must be read accurately. Accordingly, the widths of the bar codes must be uniform from top to bottom within specification tolerances. These specification tolerances are not met by the wavy side edges of lines that are formed by discrete printed dots produced by conventional ink jet printing apparatus.

To eliminate the waves on the side edges of a printed line or "smooth out" the composite side edges of a resulting printed bar, the printed dots must overlap oneanother. The conventional way to accomplish this would be to produce a nozzle assembly having a large number of orifices in a vertical row positioned very close to one another so their images, after wicking, would overlap oneanother, and to provide a correspondingly large number of control valves. As conventional, each orifice would be under the control of an undivided valve connected to it. This addition of valves would add to the cost of the ink jet printing apparatus and to the volume occupied by them.

In the present invention, a nozzle block has an array of orifices that are close enough together to smooth out the side edges of a printed vertical line or bar. For this purpose, it has been determined that the distance between orifice centers is substantially one-half the diameter of the dot as printed. For example, assuming the dots size is to be about 0.040 inch in diameter, the centers of adjacent orifices are spaced by about 0.020 inch. To produce the overlapping printed dots requires and increased number of orifices, 64 in the preferred embodiment. However, pursuant to this invention, far fewer than 64 valves are required.

In the valve of the present invention, there is an ink chamber. A single inlet port to the chamber communicates with a source of ink under predetermined pressure. There are a plurality of outlets ports also communicating with the chamber. A piston is operable within the chamber to alternately simultaneously block and simultaneously unblock all outlet ports. Each outlet port is connected by tubing to an individual orifice, but since there are a plurality of outlet ports, a single valve controls the flow of ink through a corresponding plurality of orifices. Surface tension can be maintained at each orifice opening so that at the instant the piston closes the outlet ports, the flow of ink stops and, upon withdrawal of the piston from the outlet ports, ink instantly flows to all of the orifices where ink droplets are formed and discharged.

DETAILED DESCRIPTION OF THE INVENTION

Figure 1:
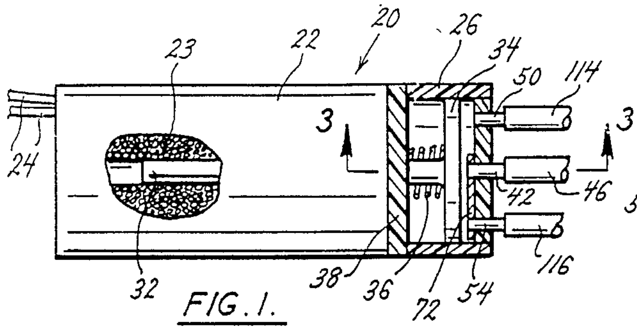
FIG. 1 is a top plan view of the valve with parts shown in section.
Figure 2:
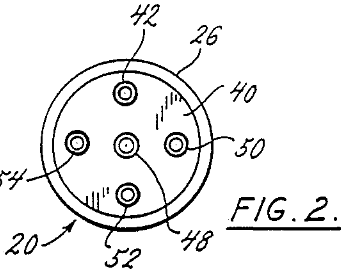
FIG. 2 is a front elevation view of the valve of FIG. 1 rotated ninety degrees.
Figure 3:
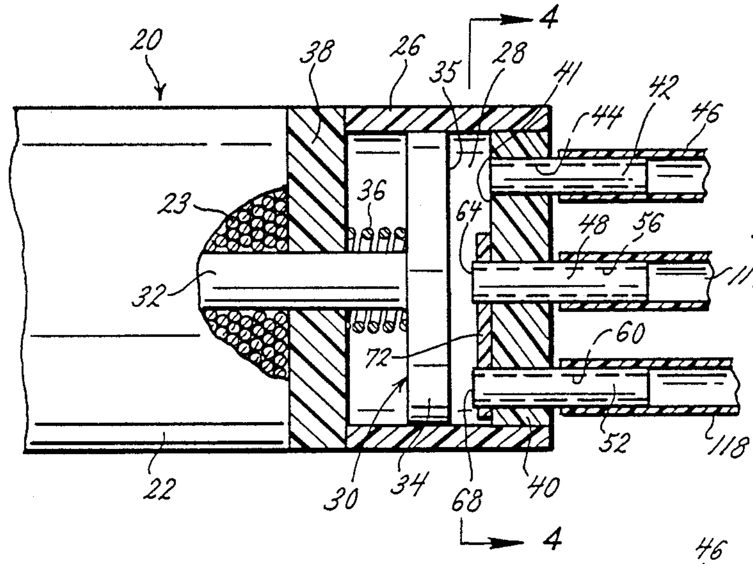
FIG. 3 is an enlarged partial view in section taken along the plane of the line 3—3 of FIG. 1.
Figure 4:
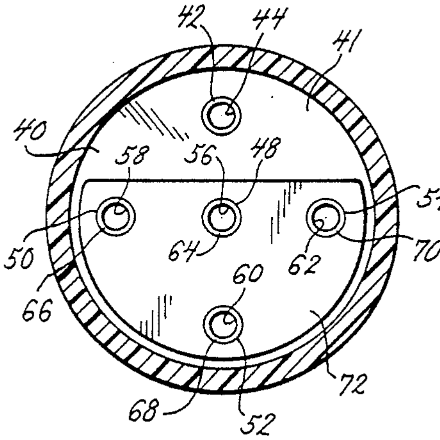
FIG. 4 is a view in section taken along the plane of the line 4—4 of FIG. 3.

The valve 20 of this invention has a body 22 containing a solenoid coil 23 with suitable connectors 24 for connecting the solenoid coil to a controller (not shown) that regulates the time and duration of opening and closing of the valve 20.

A chamber housing 26 is mounted on the body 22. A valve chamber 28 is formed within the chamber housing 26 (this may be done by forming the chamber housing 26 of separate parts that are joined together).

A piston 30 has a stem 32 of metal that is responsive to a magnetic field and that extends within the solenoid coil 23 such that energization of the coil 23 draws the stem 32 into the coil 23. An enlarged head 34 is mounted on the piston stem 32 and generally spans the area between the transverse side walls of the chamber 28 and is slideable therewithin. The piston head 34 has a face 35 formed with a hard, yet somewhat resilient, material such as synthetic rubber. A compression spring 36 bears against a wall 38 of the chamber housing 26 and against the piston head 34, constantly biasing the piston head 34 away from the wall 38 and toward an opposing wall 40 that has an inner surface 41. When the solenoid is energized, it draws the piston 34 toward the wall 38 and away from the wall 40 against the force of the compression spring 36.

An inlet tube 42 extends through the wall 40 and has an inlet port 44 in constant communication with the chamber 28. Suitable metal or plastic tubing 46 is connected to the tube 42 and to a source of ink under pressure (not shown, but conventional in the art).

A plurality of outlet tubes 48, 50, 52 and 54 also extend through the end wall 40 of the chamber housing 26. The outlet tubes 48, 50, 52 and 54 define outlet ports 56, 58, 60 and 62, respectively. However, the outlet tubes 48, 50, 52 and 54 project inwardly beyond the inner surface 41 of the wall 40 within the chamber to locate outlet port seats 64, 66, 68 and 70 inward of the wall surface 41. The outlet port seats 64, 66, 68 and 70 are all in a common plane parallel to the operating face 35 of the piston 34.

If desired, a layer 72 of hard plastic material can be glued to the chamber side of the end wall 40 to provide a backup surface against which the piston face 35 is stopped during closure of the outlet ports 56, 58, 60 and 62. It will be noted that the face 35 retains some resilience along with its toughness and that because of the resilience, the face 35 will yield to the projecting outlet port seats 64, 66, 68 and 70. The hard plastic layer 72 limits the depth of such yielding and can add to the life of the piston face 35.

This ink jet printing system has a nozzle block 76 with a plurality of orifices arranged in a vertical row. For the purposes of illustration, only part of the nozzle block 76 is shown, and only some of the orifices 78, 80, 82, 84, 86, 88, 90 and 92 are shown. In a preferred embodiment of the invention, there are 64 such orifices on about 0.020 inch centers in a linear row of about 1.25 inches, each orifice being about 0.005 inch in diameter. Such an array will print a vertical bar about 0.040 inch wide with minimized waves at the side edges. (For wider bars, the controller will be keyed to cause contigious vertical lines to be printed). There are tube stubs 96, 98, 100, 102, 104, 106, 108 and 110 communicating with the respective orifices and projecting from the nozzle block 76.

Figure 5:
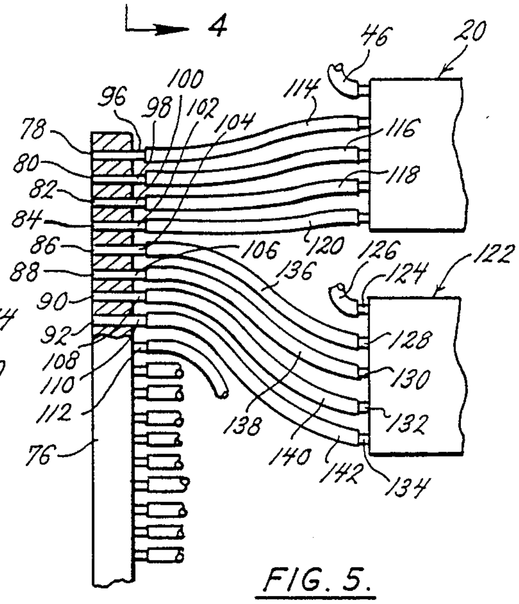
FIG. 5 is a diagrammatic view of a nozzle block and an assembly of two valves with the block.

As shown in FIG. 5, the outlet ports 48, 50, 52 and 54 are connected by suitable tubing 114, 116, 118 and 120, respectively, to selected ones of the tube stubs 96, 98, 100 and 102. FIG. 5 shows that other valves like the valve 20, represented by a valve 122, has an inlet port 124 connected by suitable tubing 126 to the pressurized ink source, and has outlet ports 128, 130, 132 and 134 connected by appropriate tubing to respective ones of the orifice tube stubs 104, 106, 108 and 110. Thus, a single valve 20 controls the flow of ink through a plurality of the nozzle orifices, as illustrated, to the nozzle orifices 78, 80, 82 and 84. Likewise, a plurality of valves represented by the valves 20 and 122 (it will be understood that there can be additional such valves) each control the flow of ink through a plurality of orifices, the valve 122 controlling the flow of ink through the orifices 86, 88, 90 and 92 (it will likewise be understood that there would be additional pluralities of orifices corresponding to the additional valves).

OPERATION

The valve 20 is normally closed. In the closed position, the compression 36 will have biased the piston head 34 away from the wall 38 and toward the wall 40 until the piston face 35 has firmly engaged the outlet ports 64, 66, 68 and 70. In this position of the piston head 34, the inlet port 44 remains open to the chamber 28, unblocked by the piston face 35, because it does not project beyond the inner surface 41 of the end wall 40.

Because all the outlet port seats 64, 66, 68 and 70 are in a common plane, the piston face 35 contacts and seats against all of them simultaneously. Therefore, all of the outlet ports 56, 58, 60 and 62 are blocked simultaneously.

Since the outlet ports 56, 58, 60 and 62 have corresponding lengths of tubing 114, 116, 118 and 120, there could be leakage of ink from the associated orifices 78, 80, 82 or 84, respectively, if ink in the tubing remained exposed to atmosphere after closing of the ports 64, 66, 68 and 70. However, since all of the outlet ports 64, 66, 68 and 70 are contacted and closed simultaneously by the piston face 35, no such exposure to atmosphere occurs after closing of the valve, and therefore no leakage of ink occurs because the surface tension at the openings of the nozzles 78, 80, 82 and 84 can overcome the pressure of the ink within the tubing 114, 116, 118 and 120, respectively.

Upon energization of the solenoid coil 23, the piston stem 32 withdraws the piston head 34 from the outlet port seats 64, 66, 68 and 70, compressing the compression spring 36. This withdrawal occurs very rapidly and communication is instantly established between the outlet ports 56, 58, 60 and 62 and the inlet port 44 through the chamber 28. This allows the pressurized ink to flow through the outlet ports 56, 58, 60 and 62 to the orifices 78, 80, 82 and 84. The duration of opening of the valve 20 is so established that only a single droplet can form and be discharged from each orifice 78, 80, 82 and 84 prior to closing of the valve 20. This closing occurs by releasing the energization of the coil 23, allowing the compression spring 36 to thrust the piston face 35 back against the seats 64, 66, 68 and 70.

There are various changes and modifications which may be made to the invention as would be apparent to those skilled in the art. However, these changes or modifications are included in the teaching of the disclosure, and it is intended that the invention be limited only by the scope of the claims appended hereto.

What I claim is:

1. A drop on demand ink jet printing system comprising a nozzle support, a plurality of nozzles supported by the nozzle support, each nozzle having an orifice, a plurality of control valves, each control valve having a chamber, an inlet port communicating with the chamber and with a source of ink, a plurality of outlet ports communicating with the chamber and with a plurality of nozzle orifices, and closure means operable between open and closed positions to open and close communication simultaneously between all the outlet ports and the inlet port and between one and another of the outlet ports whereby surface tension of ink at the orifices is maintained when the closure means is in the closed position.

2. The system of claim 1 wherein the closure means comprises a piston having a flat face, the outlet ports respectively having seats within the chamber in a common plane parallel to the piston face, means for moving the piston and the piston face toward the outlet port seats and for moving the piston and the piston face away from the outlet port seats for alternatively simultaneously engaging and simultaneously disengaging the piston face with the outlet port seats.

3. The system of claim 2 wherein the moving means comprises a compression spring for biasing the piston toward the outlet port seats to normally close the outlet ports from communication with the inlet port, and a solenoid for withdrawing the piston head from the outlet port seats to open the outlet ports.

4. The system of claim 1 wherein the orifices are spaced about 0.020 inch on centers and are about 0.005 inch in diameter to produce printed dots of about 0.040 inch in diameter.

5. The system of claim 1 wherein there are at least 50 orifices, in a lineal distance of 1.25 inches.

6. The system of claim 1 wherein there are about 64 orifices, in a lineal distance of 1.25 inches.

7. In an ink jet printing apparatus having a plurality of orifices for emitting ink toward a substrate, a plurality of valves for regulating the flow of ink through the orifices, and a controller for controlling the sequence and frequency of open cycles of the valves, each valve comprising a valve chamber, inlet means for communicating the chamber with a source of ink under pressure, a plurality of outlet ports each for communicating the chamber with an individual one of the orifices, and actuator means for alternately simultaneously opening and simultaneously closing communication between the inlet means and the outlet ports and between one and another of the outlet ports.

8. The apparatus of claim 7 wherein the actuator means comprising a unitary member for alternately simultaneously blocking and simultaneously unblocking the outlet ports.

9. In an ink jet printing apparatus having a plurality of orifices for emitting ink toward a substrate, at least one valve for regulating the flow of ink, the valve having a fluid chamber, an inlet port communicating with the chamber and with a source of ink under pressure, a plurality of outlet ports each communicating with an orifice, an actuator within the chamber movable between blocking and unblocking positions, the acutator having a wall means for simultaneously blocking the outlet ports when the actuator is in the blocking position and for simultaneously unblocking the outlet ports when the actuator is in the unblocking position, and means for selectively moving the actuator between the blocking and unblocking positions.

10. The apparatus of claim 9 wherein there are at least three outlet ports.

11. The apparatus of claim 9 wherein there are at least four outlet ports.

* * * * *